United States Patent
Lecomte et al.

(10) Patent No.: US 6,865,330 B2
(45) Date of Patent: Mar. 8, 2005

(54) OPTICAL FIBER CONNECTION AND DISTRIBUTION MODULE INTENDED FOR USE IN AN OPTICAL DISTRIBUTION FRAME

(75) Inventors: Didier Lecomte, Cavaillon (FR); Alain Lepeuve, Noisy le Roi (FR); Jean-Pierre Thibault, Guyancourt (FR)

(73) Assignee: Nexans (FR)

( * ) Notice: Subject to any disclaimer, the term of this patent is extended or adjusted under 35 U.S.C. 154(b) by 3 days.

(21) Appl. No.: 10/290,055

(22) Filed: Nov. 7, 2002

(65) Prior Publication Data

US 2003/0128951 A1 Jul. 10, 2003

(30) Foreign Application Priority Data

Nov. 13, 2001 (FR) .............................. 01 14958
Feb. 7, 2002 (FR) .............................. 02 01732

(51) Int. Cl.[7] ................................ G02B 6/00
(52) U.S. Cl. .......................... 385/135; 385/89; 385/95
(58) Field of Search ................. 385/134–135, 385/137, 95, 99, 92, 28, 147, 71, 89

(56) References Cited

U.S. PATENT DOCUMENTS

| | | | | |
|---|---|---|---|---|
| 4,818,054 A | * | 4/1989 | George et al. ............... | 385/135 |
| 4,898,448 A | * | 2/1990 | Cooper ....................... | 385/92 |
| 5,402,515 A | * | 3/1995 | Vidacovich et al. ......... | 385/135 |
| 5,461,693 A | | 10/1995 | Pimpinella ................... | 385/135 |
| 5,655,044 A | * | 8/1997 | Finzel et al. ................ | 385/135 |
| 5,850,499 A | * | 12/1998 | Sasaki et al. ................ | 385/135 |
| 5,884,003 A | * | 3/1999 | Cloud et al. ................ | 385/135 |
| 5,946,440 A | * | 8/1999 | Puetz ......................... | 385/135 |
| 5,982,972 A | * | 11/1999 | Tucker et al. ............... | 385/135 |
| 5,987,203 A | | 11/1999 | Abel et al. .................. | 385/51 |
| 6,041,155 A | * | 3/2000 | Anderson et al. ........... | 385/139 |
| 6,157,766 A | | 12/2000 | Laniepce et al. ............ | 385/134 |
| 6,226,434 B1 | * | 5/2001 | Koshiyama et al. ......... | 385/134 |
| 6,282,360 B1 | * | 8/2001 | Milanowski et al. ........ | 385/135 |
| RE38,311 E | * | 11/2003 | Wheeler ...................... | 385/135 |

FOREIGN PATENT DOCUMENTS

| | | |
|---|---|---|
| DE | 2648300 | 6/1989 |
| EP | 0724367 | 7/1996 |
| JP | 9159841 | 6/1997 |
| WO | 9520175 | 7/1995 |

OTHER PUBLICATIONS

Preliminary Search report for French Application Ser. No. FR 0114958 dated Aug. 2, 2002.

"High density pin board matrix switches for automated MDF systems" IEEE Transactions on components, Hybrids and manufacturing Technology, by Kanai et al., Oct. 15, 1992.

* cited by examiner

*Primary Examiner*—Karl D. Frech
*Assistant Examiner*—Edwyn Labaze
(74) *Attorney, Agent, or Firm*—Sofer & Haroun, LLP

(57) ABSTRACT

In a module for connecting and distributing optical fibers, intended for use in an optical distribution frame, the first end of each fiber is connected to a connecting socket and the second end of each fiber is connected to an optical distribution or transmission cable. The module includes an arm for guiding each fiber fixed by its first end to a support for a row of connecting sockets and connected by its second end to a cassette for coiling up each fiber. The cassette is articulated to the arm.

10 Claims, 8 Drawing Sheets

FIG_1 (Prior Art)
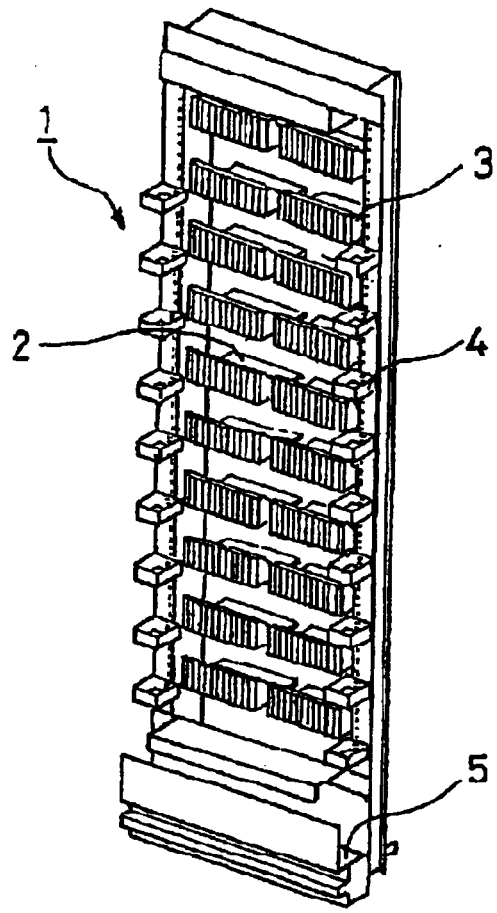
FIG_2 (Prior Art)
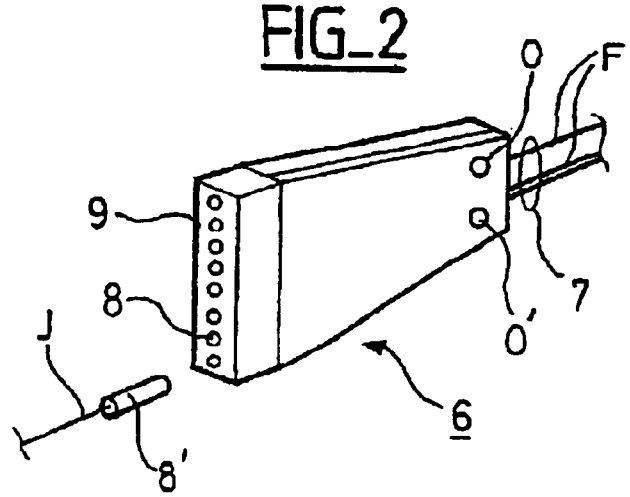

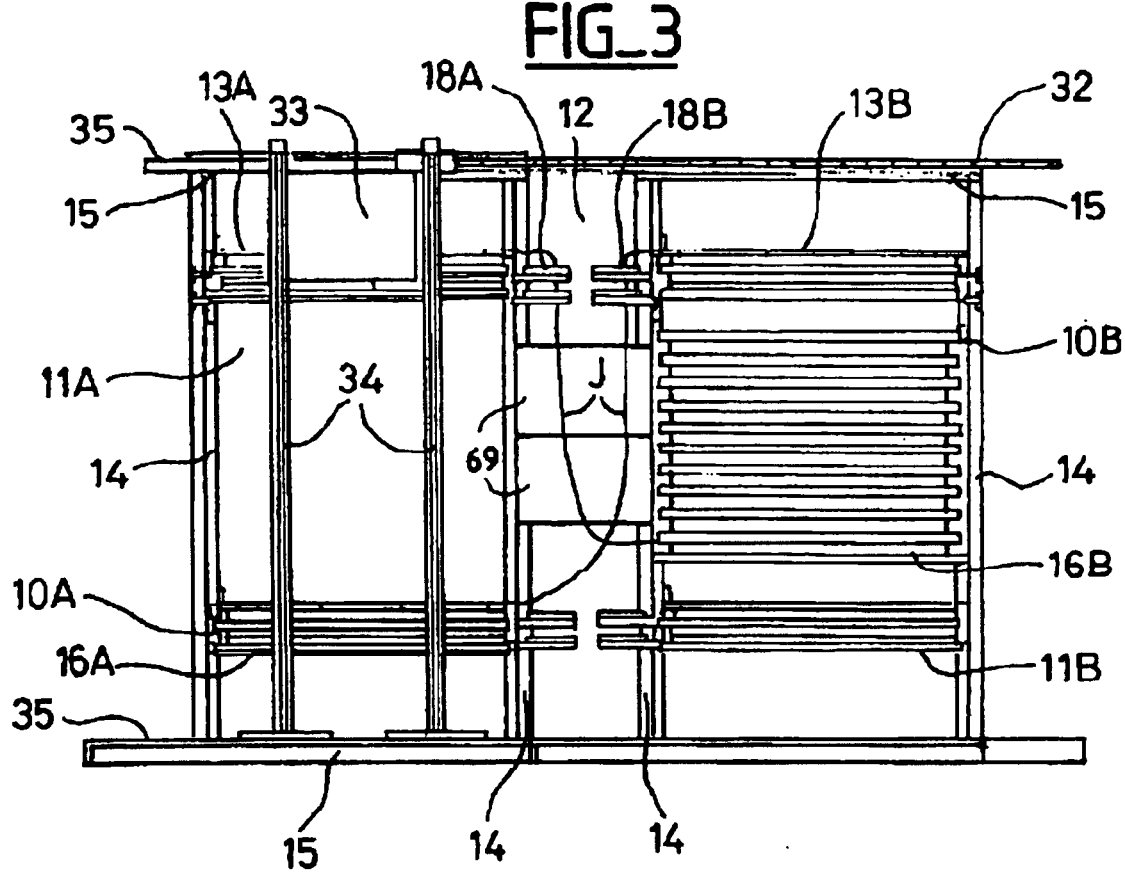
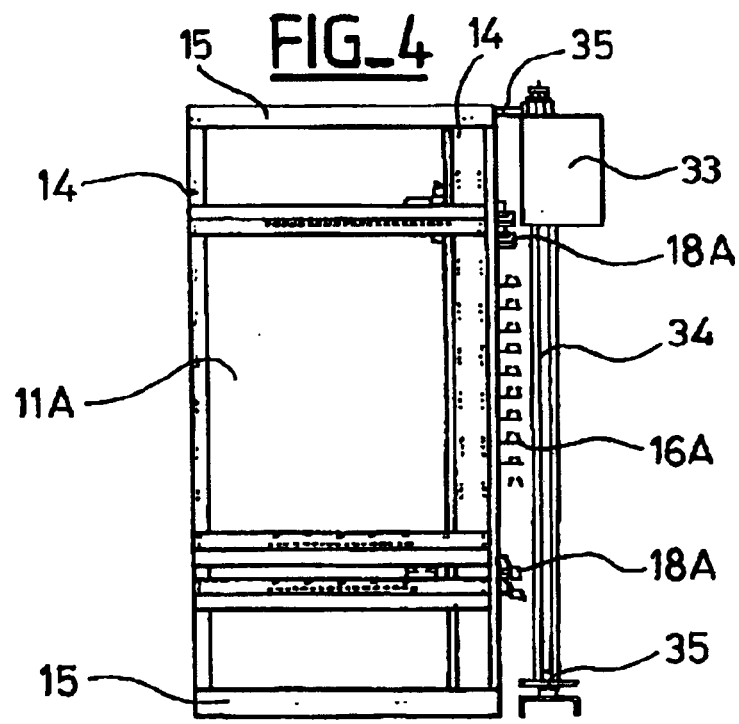

FIG_5
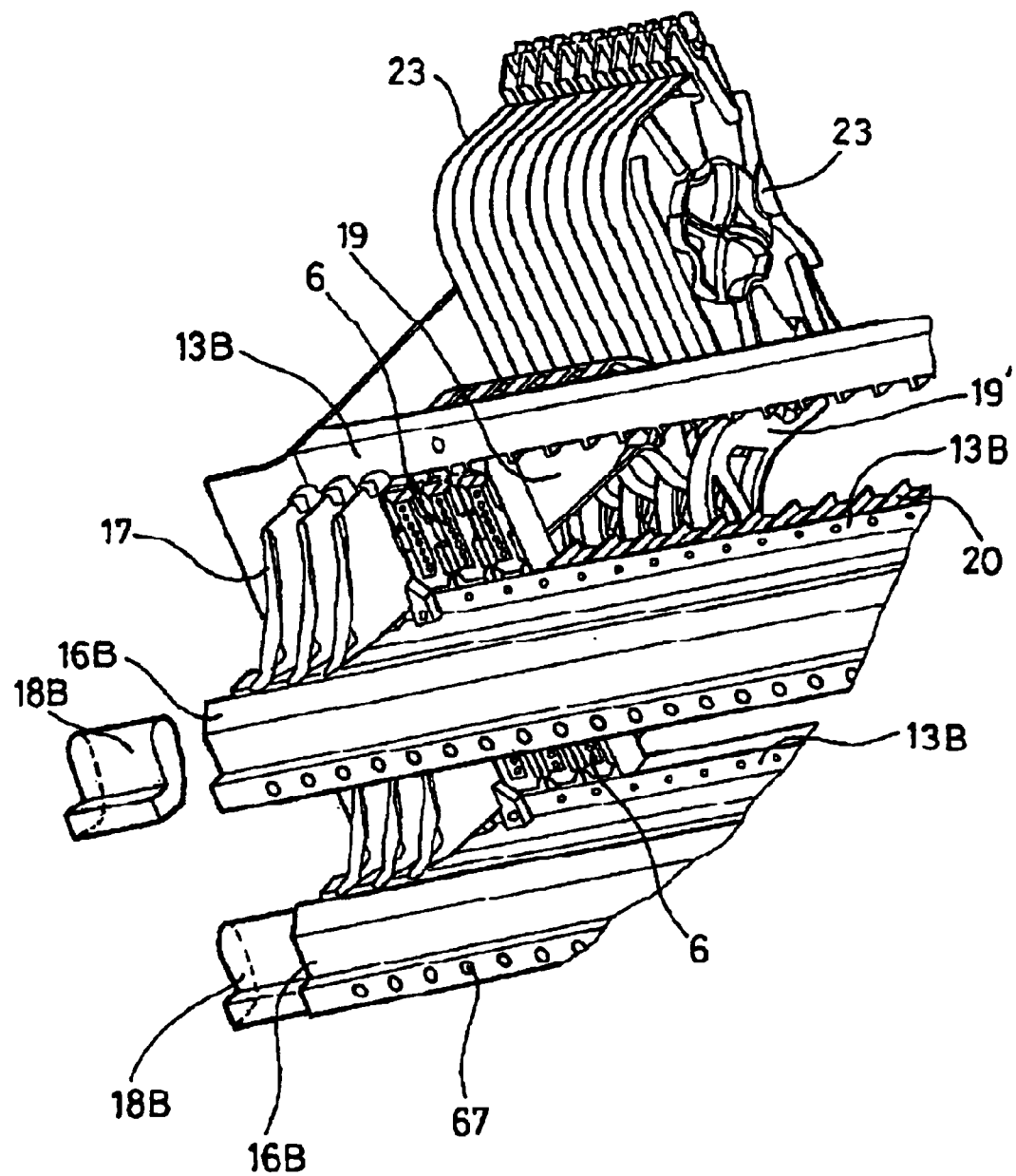

FIG_6
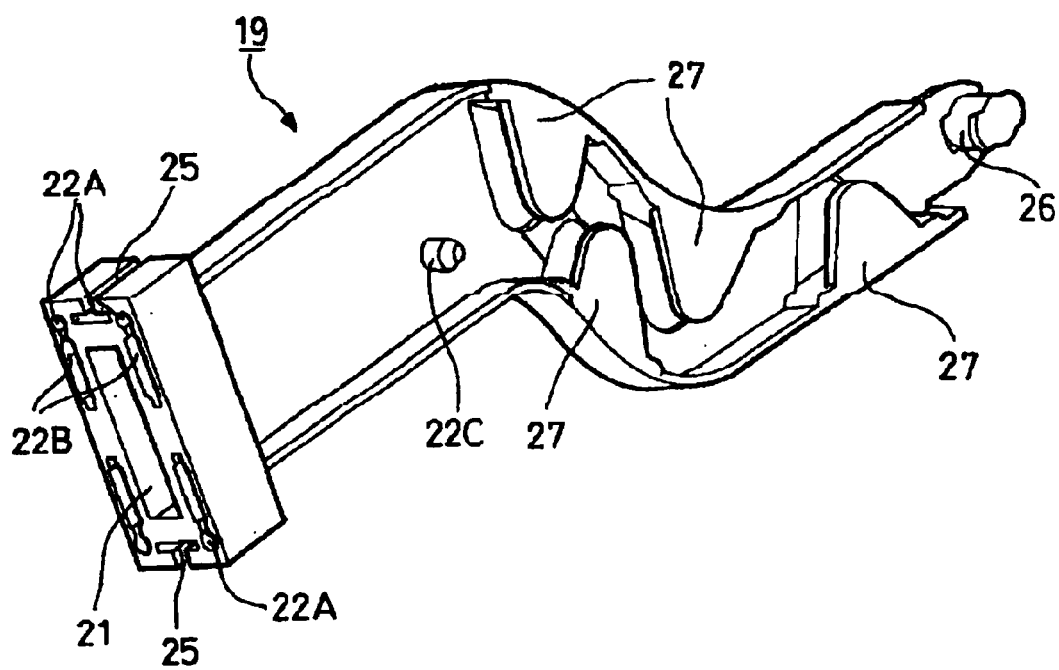
FIG_7
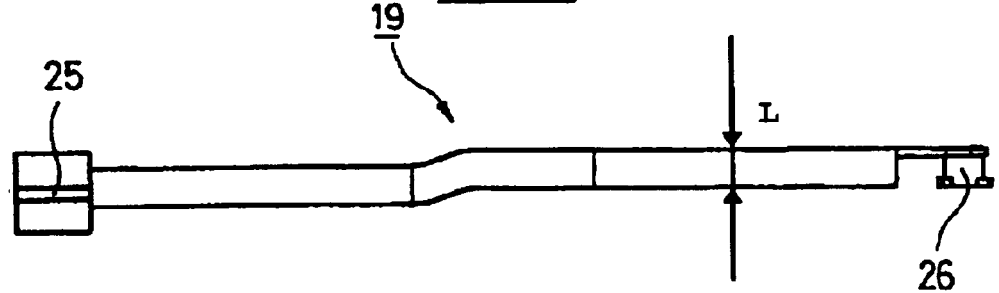

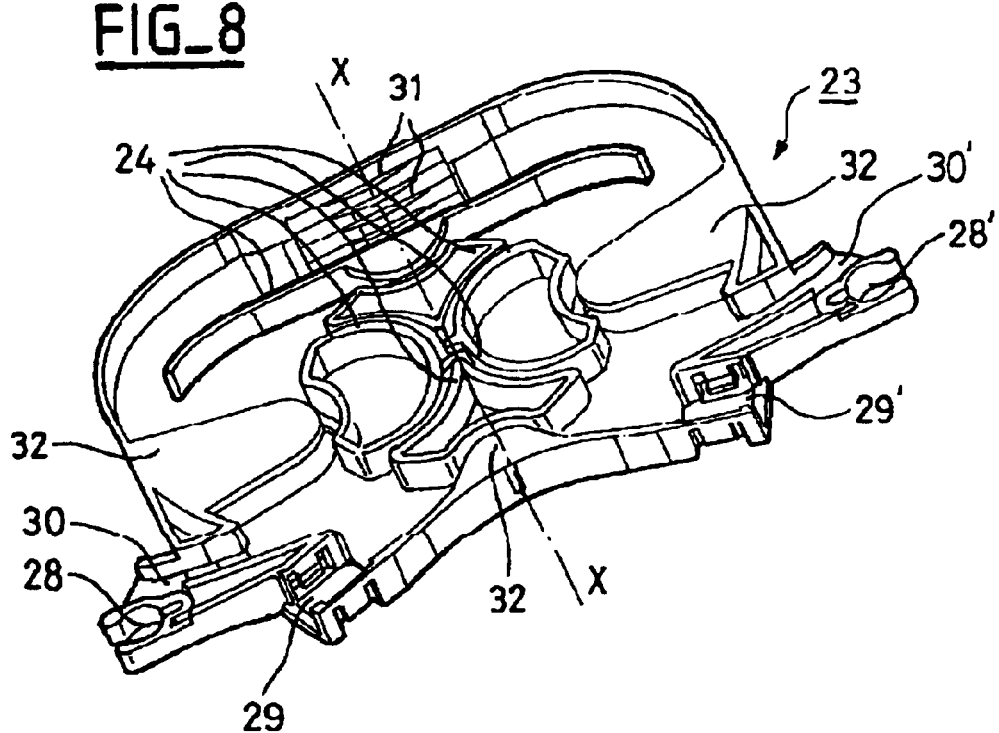

FIG_9A
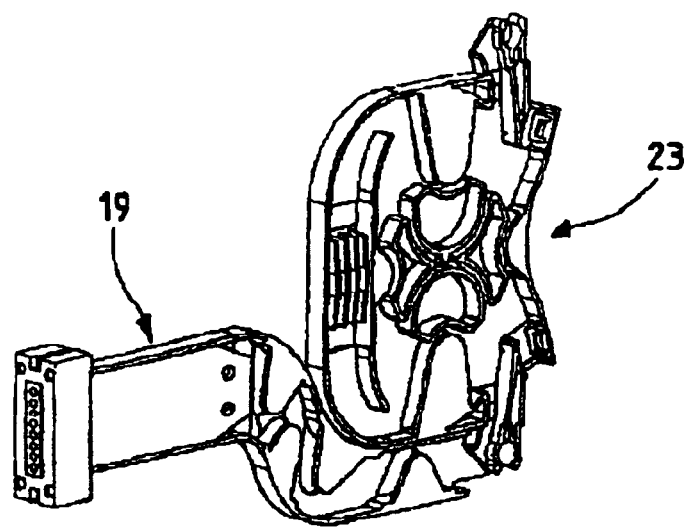
FIG_9B
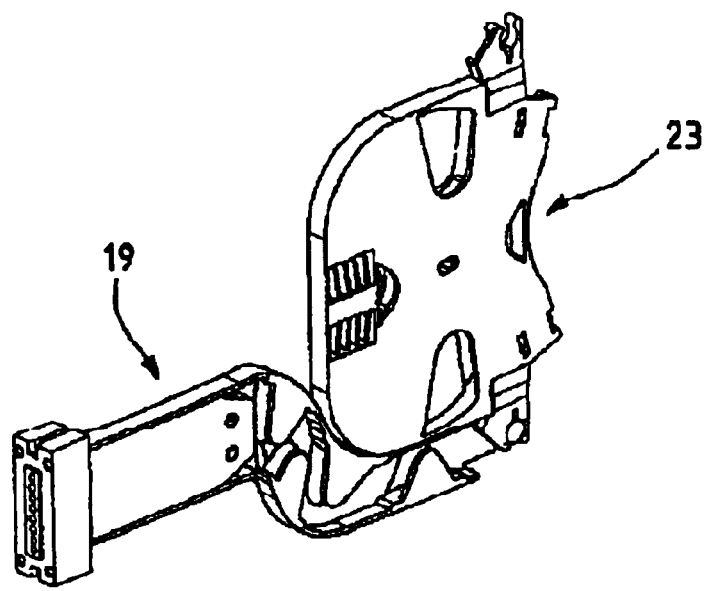

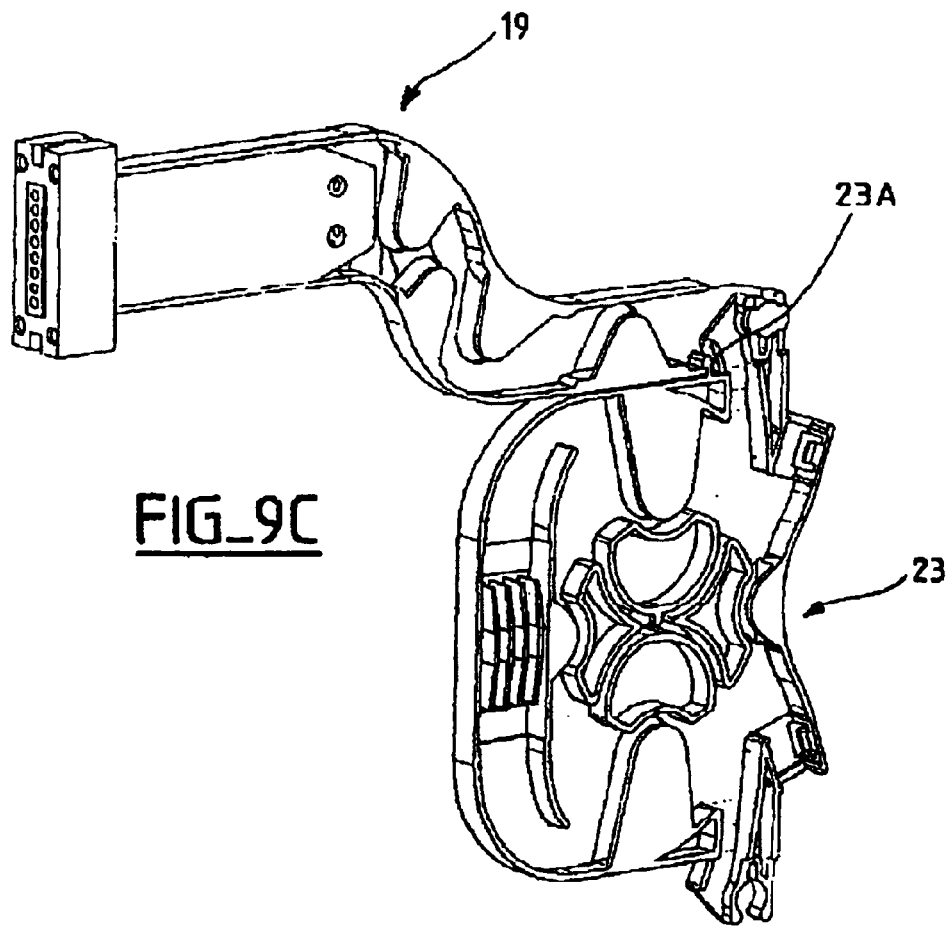
FIG_9C
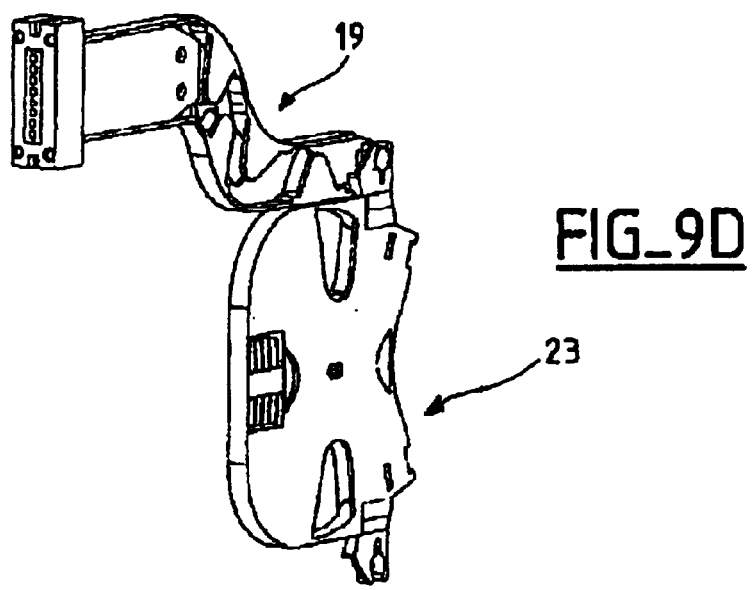
FIG_9D

FIG_10
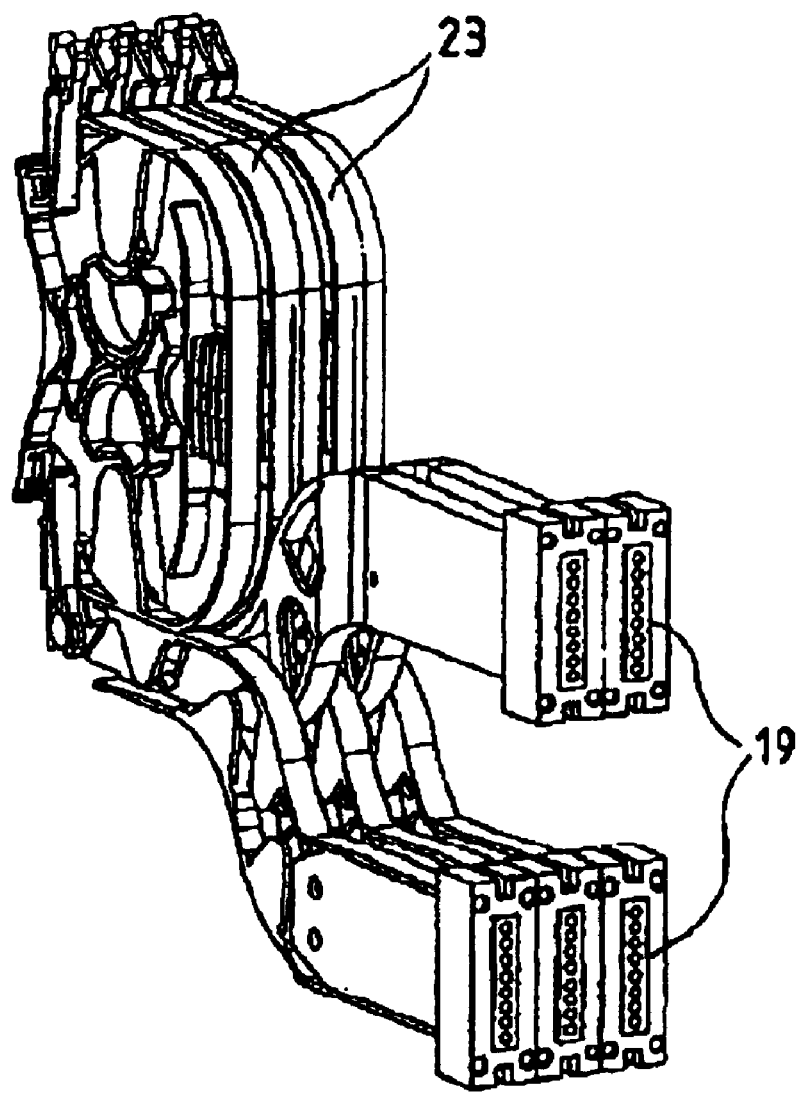

OPTICAL FIBER CONNECTION AND DISTRIBUTION MODULE INTENDED FOR USE IN AN OPTICAL DISTRIBUTION FRAME

BACKGROUND OF THE INVENTION

1. Field of the Invention

The invention relates to an optical fiber connection and distribution module intended for use in an optical distribution frame for selectively interconnecting optical fiber links in a telecommunication installation comprising a large number of fiber links.

2. Description of the Prior Art

U.S. Pat. No. 5,497,444 describes one example of an optical distribution frame for use in telecommunication installations. It is shown in FIG. 1 and has a rectangular framework 1 which carries a series of horizontal supports 2 on which are placed modules 3 which are arranged on the supports so that they constitute two parallel vertical subassemblies. Each module is designed to accommodate a plurality of connectors, each connector being adapted to interconnect two fibers, one of which is used as a jumper. This kind of interconnection of two fibers is effected by means of two connection members each of which is fitted to the end of a fiber and which are placed opposite each other at a connector. The fiber connection members serving as jumpers are placed in front of the connectors in the distribution frame and the connection members of the other fibers that they interconnect are placed behind them. Support and guide members are provided for organizing the passage of the jumpers between the connectors, allowing for future reorganization requirements, and in FIG. 1 are represented by split rings 4 and troughs 5.

For reasons of orderliness and safety, the jumpers are either run horizontally in horizontal troughs, and in particular in troughs associated with the horizontal supports of the modules, or vertically, to be more specific in split rings defining a vertical guide at each widthwise end of the distribution frame. For reasons of standardization, the optical jumpers, which are usually manufactured in a factory, are generally of a particular length sufficient to connect the farthest apart connection members of the distribution frame, and the jumpers connecting connection members that are less far apart must be coiled up in order to accommodate their surplus length within the distribution frame. They are accommodated inside or in the vicinity of the vertical guides, for example, and specific provision must therefore be made for this.

This kind of solution was initially developed for jumpers consisting of electrical wires, and is not satisfactory if the distribution frame is a high-density distribution frame with a very high capacity, involving the fitting of a very large number of optical jumpers, for example ten thousand or more, which may be fragile and which must therefore be protected from damage, in particular during reorganization.

U.S. Pat. No. 4,585,303 describes an optical fiber connection and distribution module arrangement including a plurality of connection supports each including a hollow arm sliding in a module and equipped at one end with a connector and at the other with a cassette for coiling up an optical fiber connected to the connector inside the arm. The other end of each optical fiber is connected to the distribution or transmission optical cable.

Although this kind of connection and distribution arrangement is undoubtedly compact, it suffers from the following technical problems.

To work on the fibers in the cassettes, the arm is slid out of the module with the cassette, which is rigidly fixed to it. Although, because of the surplus length of fiber, the fiber can remain connected to the cable at one end, the connector at the other end of the fiber has to be disconnected. In other words, any operation on the section of optical fiber inside the cassette involves moving all of the optical fiber disposed in the module. This imposes a particularly heavy workload.

Moreover, this prior art arrangement necessitates a large working area outside the module, because of the bulk of the arm and the cassette when the arm is slid out of the module.

The invention solves these problems by providing a connection and distribution module enabling work to be carried out on the optical fiber coiled up in the cassette without necessitating its disconnection and without requiring a lot of space, combined with a particularly compact distribution that is particularly suitable for a high-density distribution frame.

SUMMARY OF THE INVENTION

To this end, the invention proposes a module for connecting and distributing optical fibers, intended for use in an optical distribution frame, a first end of each fiber being connected to a connecting socket and a second end of each fiber being connected to an optical distribution or transmission cable, which module includes an arm for guiding each fiber fixed by its first end to a support for a row of connecting sockets and connected by its second end to a cassette for coiling up each fiber, in which module the cassette is articulated to the arm.

Articulating a cassette to a fixed support arm in a distribution frame allows it to be moved between positions that correspond to a normal position, in which it is inserted between two other cassettes, with which it is then aligned, and a position suitable for working on it, in which it is virtually completely withdrawn from the row of cassettes in which it is normally incorporated.

In a preferred embodiment of the invention, the arm is fixed.

In a preferred embodiment, the arm has at its second end an articulation member for the cassette consisting of a horizontal pivot.

The pivot preferably projects laterally from a plane extension of the bottom of a U-shaped passage formed by the arm.

The U-shaped channel accommodates and holds in place intermediate connecting fibers running between the individual connection members of the socket, which are housed in the arm, and the connecting fibers, which come from distribution or transmission cables terminating at the distribution frame, and which have a coiled upper end connected by a splice to one of the intermediate connecting fibers in the cassette carried by the arm.

The articulation member projects laterally from a plane extension of the bottom of the U-shaped channel for intermediate fibers that the arm forms, which frees a passage for these intermediate fibers toward the interior of the cassette carried by the arm, regardless of the position of the cassette relative to the arm that carries it.

In a preferred embodiment, the cassette includes an articulation member in the form of a pivot clip complementary to the articulation member carried by the support arm.

The complementary articulation member carried by the cassette is advantageously surrounded by two fiber conduits, a first of the conduits, on the inward side of the cassette relative to the other one and the complementary articulation member that it adjoins, being adapted to convey each fiber toward the arm carrying the cassette when the latter is carried by the complementary articulation member that the first conduit adjoins, the second of the conduits, which is on the outward side of the cassette relative to the first conduit and the complementary articulation member that it adjoins, being intended for the passage of fibers emanating from distribution or transmission cables that are connected to the cassette.

Thus the input/output fibers and the intermediate connecting fibers connected between them at a cassette penetrate via channels that are reserved for them on either side of the same shaft clip of the cassette.

The cassette preferably includes two articulation members symmetrically disposed with respect to the transverse plane at the end of one of the longer sides of the module that the cassette forms articulated by one or the other of the two complementary articulation members claimed in the mounting provided for the arm.

The arm is advantageously bent twice in opposite directions in two dimensions and preferably halfway along its length.

The arms constituting the individual support members of the sockets and the cassettes in a rack are adapted to be assembled in groups each combining the sockets of two adjacent rows, each of which is fixed to two parallel supports, one of which is common to them, and along which the arms are alternately positioned, one above it and the next below it.

The arms, which are identical, are bent twice in opposite directions in two dimensions to enable the cassettes carried by respective arms, alternately on either side of one of the parallel supports that is common to the group, to be placed in the same row within the rack when they are in their normal position, because of the alignment of the members for articulating the cassettes that the alternating arms include on either side of the same common support, and because of the respective dimensions of the cassettes and the arms.

Bending the arm about two perpendicular axes allows a head-to-tail arrangement of two superposed arms within a width limited to the increment for positioning the modules.

The cassette advantageously carries a clipping pawl adapted to cooperate with a corresponding orifice in the arm.

The invention, its features and its advantages are explained in the following description with reference to the figures referred to below.

BRIEF DESCRIPTION OF THE DRAWINGS

FIG. 1 corresponds to a perspective view of the prior art optical distribution frame briefly described hereinabove.

FIG. 2 shows one example of a prior art connection socket and a plug, as envisaged in a distribution frame claimed in the invention.

FIG. 3 is a front view of an optical distribution frame claimed in the invention.

FIG. 4 is a right-hand side view of the optical distribution frame shown in FIG. 2.

FIG. 5 is a partial perspective view of a detail of construction relating to the distribution frame shown in FIGS. 3 and 4.

FIGS. 6 and 7 are respectively a perspective view and a plan view of one example of a support arm for a connecting socket of an optical distribution frame claimed in the invention.

FIG. 8 is a perspective view of a fiber cassette of an optical distribution frame claimed in the invention.

FIGS. 9A, 9B, 9C, 9D and 10 are perspective views of a module according to the invention.

DETAILED DESCRIPTION OF THE PREFERRED EMBODIMENTS

FIG. 2 shows one example of a multipoint optical socket 6 which can be pre-assembled. The socket is for individually connecting a given number of jumpers J, which consist of a single optical fiber in this example, to a corresponding number of optical fibers F, usually coming from the same distribution or transmission cable of an installation. The jumpers and the fibers to which they are connected are fitted with complementary individual connection members. In the embodiment shown here, the jumpers are equipped with individual male plugs, such as the rectilinear tubular plug 8' fitted to the end of a section of jumper J in FIG. 2, while the fibers to which these plugs must be connected are fitted with complementary connection members 8, which here are aligned, and which open onto a front face 9 of the socket, as can also be seen in FIG. 2. For example, a socket connects optical fibers which are part of the same group 7, for example a group 7 comprising eight fibers from a cable. Each connection member 8 is adapted to receive a fiber, for example from a cable, and a plug terminating a jumper fiber, the two fibers being placed end-to-end with respect to each other. The connection plugs are tubular plugs, for example, each designed to be traversed longitudinally by a jumper fiber. The fiber is terminated at a plug-in end of the plug that it traverses and in which it is immobilized. It is immobilized by crimping it, for example. The plug-in end is adapted, in a manner that is known in the art, to locate in a conduit formed for it in a complementary connection member 8, and can be elastically retained in position in that member, after plugging it in, should this be deemed preferable. In a preferred embodiment of the invention, each socket has one or more (preferably two) positions marks 0, 0', which in this example consist of two vertically aligned holes, considering the front face of the socket to be in a vertical reference plane.

Using jumpers different from those referred to above can of course be envisaged in the context of a distribution frame according to the invention, for example jumpers consisting of cables comprising a plurality of fibers, fibers with loose or tight isolation, or multifiber ribbons. Appropriate plugs and sockets are then provided. They are known to the person skilled in the art and are not described in detail here.

To simplify the description, the jumpers referred to in the remainder of the description are each considered to consist of a single optical fiber. It must nevertheless be understood that the invention relates to a method of providing jumpers and to distribution frames that can be used with jumpers of different types, as indicated above.

FIGS. 3 and 4 show one non-limiting example of an optical distribution frame in accordance with the invention for use in a telecommunication installation. It has a high capacity and a high density of connection members or points, and includes one or more aligned distribution racks, here two such racks 11A and 11B, each of which includes a set of sockets, as described above. These sockets are for selectively interconnecting fibers of distribution or transmission cables that terminate at the distribution frame, the connections being made by means of jumpers whose ends are fitted with plugs compatible with the connection members of the sockets.

In the example offered here, the two racks 11A, 11B are separated from each other by a cross-connect area 12 for running jumpers connecting the sockets of one of the racks to those of the other rack, the racks usually being dedicated, for example one to outgoing links and the other to incoming links. If there are more than two racks, it is of course possible to provide for running jumpers either across a single cross-connect area between two of the racks or in distributed areas, each lying between two racks, if necessary. It must also be understood that, in a distribution frame comprising only one rack, it is possible to provide a cross-connect area for running jumpers vertically on one or both sides of the rack.

The sockets are of the type shown in FIG. 2 and are assembled by rows into matrix structures in which their front faces are preferably coplanar. Marker means are provided to show the position of each socket in the set consisting of all the sockets of the distribution frame and the position of each connection point belonging to one of the sockets and corresponding to an individual connection member.

As shown also in FIG. 3, the sockets are arranged in parallel horizontal rows that are preferably aligned from one rack to another if there is more than one rack and which, in the example shown, are identically referenced 10A or 10B, according to the rack that accommodates them. The sockets 6 are mounted on horizontal sections that each rack has on a front face, two of these sections 13A and 13B being shown with no sockets in FIG. 3. The parallel rows of sockets are interrupted at the cross-connect area 12 between the adjacent racks.

The means for marking the positions of the sockets in the distribution frame comprise, for example, openings that are spaced regularly at the pitch of the sockets on the horizontal sections on which the sockets are mounted, or possibly on members of the distribution frame that are fixedly associated with those sections, for example horizontal troughs individually associated with the sections. The marker means comprise holes 67 formed at regular intervals in the sections or the troughs, for example, as shown for the sections 13B or the troughs 16B in FIG. 5. They can also take the form of regular notches 68 along the sections or troughs, as shown in FIG. 16, or consist of optical marks, for example optical patterns or bar codes.

Connecting the fibers from the various distribution and transmission cables to the sockets 6 involves using dedicated hardware means that here are organized into connection and distribution modules. These modules take the form of cassettes individually articulated to individual support members which here take the form of arms. They are accommodated in the interior volume of each rack so that the sockets they carry have their front faces coplanar. The interior volumes specific to the racks are delimited by the framework of beams serving as support and connecting members of the distribution frame, such as the vertical beams 14 and horizontal beams 15 of the racks 11A and 11B (see FIGS. 3 and 4). In the embodiment envisaged here, the sections 13A and 13B that support the rows of sockets are fixed to the vertical beams 14 around the front face of the rack that includes them. A horizontal trough is associated with each row of sockets, the troughs of the various rows in FIG. 3 being identically referenced 16A or 16B, depending on the rack 11A or 11B to which they are fitted.

Each of the troughs 16A or 16B is intended to receive the optical fibers constituting the jumpers that are connected to the connection members 8 of the sockets 6 whose compartments are situated immediately above, as shown in FIG. 5 for one of the troughs 16B. Jumper-guide members 17 are fixed to the sections supporting the sockets so as to run from top to bottom along the compartments of the connection members 8 of each socket 6, above each horizontal trough. These members are adapted to guide each jumper between the trough in which it rests and one of the compartments of a socket situated immediately above that trough. The jumper-guide members 17 are designed to facilitate depositing jumpers in the troughs and adjusting their length and tension, avoiding adjacent jumpers crossing over in them. Here they are slightly curved to guide the fibers that run in them in the horizontal trough that they overlie and toward the cross-connect area 12 which is located at the center of the distribution frame in the embodiment shown. The cross-connect area 12 provided between two adjacent racks, such as the racks 11A and 11B, here has dimensions providing a passage for all of the jumpers that can be fitted, each connecting one connection member 8 of a socket 6 of a rack to a connection member of a socket of the other rack. This is possible regardless of the respective positions of the members, the sockets that incorporate them, and the troughs associated with the sockets in the racks.

If two connection members that are part of sockets at different heights in the two racks that include them are connected by a jumper, the latter runs from the vertical level of the trough that serves one of the sockets to that of the trough that serves the other one in a cross-connect area 12. The jumpers crossing a cross-connect area 12 are held in a particular position within that area 12 by general guides, such as the guides 18A and 18B, for retaining and protecting the jumpers. Here the general guides take the form of elongate members forming arms carried by adjacent racks and partially closing off the cross-connect area 12, leaving a vertical passage centrally between them for introducing fibers into the area, as can be seen in FIG. 3 in the case of the embodiment described here.

Here the general guides are associated in pairs, the two general guides of a pair being mounted at the same vertical level on respective opposites sides of a cross-connect area 12 between two adjacent racks. In the embodiment shown in FIG. 5, the two general guides 18B shown are each aligned with the front edge of a trough 16B. They are designed to retain jumpers in the cross-connect area 12 running vertically at their respective levels and which pass through troughs of the rack incorporating the trough with which each of them is respectively aligned. Closure plates 69 carried by beams of the framework of the distribution frame limit the cross-connect area 12 behind the general guides, as shown in FIG. 3.

As indicated above, in the embodiment envisaged here, the sockets 6 are carried by individual support arms fixed side-by-side to the horizontal sections, like the support arms 19 and 19' that can be seen partly in FIG. 5, and one of which is shown in detail in FIG. 6. Each of these support arms includes a housing open at one end which is adapted to enable it to receive a socket, and here the support arms are fixed to the horizontal sections of the socket support, as shown in FIG. 5 in the case of the arms 19, 19'. The sections like the sections 13A, 13B are designed to allow positioning of the arms and therefore of the sockets, as symbolized by ribs 20 shown on the two sections 13B at the top in FIG. 5.

FIGS. 6 and 7 show one embodiment of a support arm 19 which, as indicated above, includes a central housing 21 at a first end to receive a socket 6 which is accurately positioned therein so that the front face and the compartments of the connection members of the socket are in predetermined positions. If the jumper connections between connection members of different sockets is automated, it is necessary to provide means for positioning the plugs that terminate the jumpers in the conduits of the connection members 8 into which those plugs must be inserted.

In the proposed embodiment, means are provided at the end of a support arm which includes a central housing 21 that cooperates with complementary means provided on a device by means of which a plug is located in front of the connection member compartment 8 into which it must be inserted. In the embodiment described, the means provided at the end of a support arm are hollow shapes adapted to receive complementary solid shapes, these shapes being chosen to achieve the positioning accuracy necessary for inserting a plug in the connection position into a conduit of a connection member whose position in the distribution frame is predetermined. In a first embodiment, the means provided at the end of a support arm take the form of cylindrical cavities 22A at the first end of each arm and each extended laterally by a slot 22 with a particular orientation. The socket 6 is immobilized in the arm in a particular position, its position being confirmed by a polarizer 22C provided inside the arm and adapted to penetrate one of the holes 0 or 0' constituting the positioning marks of a socket 6 when the socket is in the position provided for it in the arm, the hole to be used being predetermined.

In the embodiment shown, there are four cylindrical cavities 22A disposed around the opening of the housing 21 provided for a socket 6 at the first end of a support arm 19. The cavities 22A are connected in pairs by a slot 22B that is common to them and is oriented parallel to the alignment axis of the compartments of the connection members 8 of the socket 6 housed in the arm shown. A centering rod, which is preferably cylindrical and whose diameter then corresponds to that of a cavity 22A, serves as the complementary solid shape for the device for positioning a plug. This centering rod, not shown, is extended laterally by a projecting portion whose dimensions correspond to those of a slot 22B in which it locates when the rod that carries it is in a cavity 22A, to provide a precise indication as to the position of the device it equips. Here there are four cylindrical cavities 22A and two slots 22B for each support arm.

In a second embodiment, the plug positioning device can be accurately positioned relative to one of the cylindrical cavities 22A disposed around the opening of the housing 21 of a support arm 19. To this end, the positioning device is displaced mechanically to a predetermined position relative to the distribution frame, or to be more precise relative to a connection member 8 of a socket 6 accurately positioned in one of the racks of the distribution frame. The penetration of the centering rod of the plug positioning device into a particular cylindrical cavity 22A can then also serve to pre-position the tool of the device used to insert a plug into the conduit of a particular connection member 8 of a particular socket 6. The tool is then designed so that the plug has some facility for accommodation and relative freedom of lateral movement on insertion. This facility is provided by one or more springs where the tool is fixed to the device that carries it, for example.

In the embodiment envisaged here, the arm is bent twice in opposite directions halfway or approximately halfway along its length and in two dimensions, as shown in FIGS. 6 and 7, so that its two ends are offset relative to each other, this arrangement being adapted to allow high-density mounting of the arms 19, 19', the sockets 6 and the cassettes 23 for coiling up the fibers constituting the jumpers in a distribution frame, as shown in FIG. 5.

In a preferred embodiment, the first end of an arm cooperates with two immediately adjacent support sections of a rack between which it plugs in. To this end, it includes two positioning slots 25 adapted to slide on facing ribs 20 at the same horizontal level on the support sections between which the first end of the arm is inserted, these slots being shown in FIGS. 6 and 7 and the ribs being shown in FIG. 5.

The second end of an arm includes an articulation member 26 which here comprises a lateral shaft adapted to be horizontal when the arm is in place in a distribution frame. The articulation member 26 is intended to serve as a support for a cassette, as briefly mentioned above, which to this end includes a complementary articulation member, here of the shaft clip kind, as can be seen in FIG. 8.

The double-bend structure that joins the two ends of an arm takes the form of a hollow body delimiting a U-shaped lateral passage that terminates in the housing 20 of a socket 6 at one end and in an extension of the bottom of the U-shape that carries the articulation member shaft 26. This lateral passage is provided for the group 7 of fibers that connect the connection members of a socket 6 to a cassette. Here it is provided with a labyrinth consisting of retaining lugs 27 extending above the bottom of the passage, from the two flanks of which the lugs project alternately from one flank toward the other, to retain the fibers in the passage after they have been inserted therein. In a preferred embodiment, the dimension of the end of the arm, and here of its front face, in a direction parallel to the sections 13B between which it is positioned is made to be twice the width L of the other parts of the arm and the cassette in the same direction. This arrangement represents an improvement in terms of the socket density in that it provides for alternating structures belonging to support arms on which are mounted sockets 6 disposed in two immediately adjacent rows, when the sockets of those rows are fixed above and below the same section 13A or 13B inserted between them, the corresponding arms having their respective articulation members 26 alternately above and below the sockets that the arm carries when the sockets are in position in the distribution frame. In the embodiment shown, this alternation is also reflected in alternating orientations of the passages and the articulation members of the alternate support arms with respect to two rows of immediately adjacent sockets. The respective articulation shafts 26 of the various arms mounted on either side of the same section are then all aligned and face each other in pairs.

Because of the density of the sockets 6, the spacing between two rows of sockets 6, which is 80 mm in the example shown, and the minimum radius of curvature of the optical fibers, the width L allows the use of two rows of N sockets, each at the increment of 2L, and 2N cassettes can therefore be aligned over a distance of 160 mm.

FIG. 8 shows a preferred embodiment of a cassette 23 for the fibers of a bundle, which cassette is usually molded from an insulative material to form an open module with a flat bottom which here is symmetrical with respect to a median transverse plane XX. The module is closed when the cassettes are in the normal position in the distribution frame by the bottom of an identical or similar module pressed against it. The proposed cassette is approximately rectangular in that it has two symmetrically rounded corners on one of its longer sides and two projecting shaft clips 28, 28' symmetrical with respect to the median transverse plane XX on its second longer sides. Its overall thickness is equal to the width L of the arm previously referred to, and so it is possible to stack along a support section and over the same lengthwise distance a number of cassettes corresponding to the number of alternate support arms and thus to the number of sockets carried by those arms, with the sockets alternately above and below the section concerned, as shown in FIG. 5.

The clips 28, 28' of a cassette are adapted to clip onto an articulation member shaft 26 on a support arm 19 to fasten together the arm and the cassette. Each symmetrical C-shaped clip is adapted to clip elastically around a support arm articulation member shaft 26 to allow subsequent rotation of the cassette about the shaft and to allow the cassette to be detached from the support arm by pulling on the cassette. The presence of a clip 28 or 28' at each end of a cassette is not essential, but has the advantage that the cassettes can be aligned so that they all have their open sides oriented in the same chosen direction when they are mounted on support arms whose articulation member shafts are aligned. One direction is then defined by the cassettes mounted with each of their respective clips 28 around one of the aligned shafts, while the other direction is alternately defined when the cassettes have each of their respective clips 28' around one of the aligned shafts.

In the embodiment shown in FIG. 5, the aligned cassettes are articulated to the support arms 19, 19' by their respective clips 28 and the bottom of one closes off the open side of the next one. The aligned cassettes are alternately carried by support arms whose respective articulation members 26, not shown in FIG. 5, are positioned below the sockets 6 that they carry, in the distribution frame, and the others by support arms whose respective articulation members 26 are above the sockets 6 that they carry. A cassette is accommodated either above a support arm against which it is pressed through whichever of its shorter sides carries the clip by which it is articulated to the arm, when the latter has its articulation member above the socket 6 that it includes, and when it is in place in the distribution frame. Alternatively a cassette is cradled in the hollow of the bend near the articulation member of the support arm to which it is articulated when that arm has its articulation member below the socket 6 that it incorporates, and when it is in place in the distribution frame. The dimensions chosen for the component parts of the support arms and the cassettes that have to cooperate, when the arms are in place in the distribution frame and the cassettes are associated with them, are therefore chosen so that the cassettes of one row are stowed in the same manner whereas the support arms that carry them are disposed in accordance with the alternating arrangement defined above. This is known in the art. Articulating a cassette to a support arm fixed in a distribution frame allows it to be moved between positions that correspond to the normal position in which it is inserted between two other cassettes, with which it is then aligned, those cassettes being carried by distributor frame arms mounted differently from that to which it is articulated, and a position convenient for working on it, in which it is virtually totally withdrawn from the row of cassettes in which it is normally incorporated.

Moreover, each cassette 23 incorporates structures 24 adapted to receive coiled up optical fibers (see FIG. 8). For the same cassette, the optical fibers include fibers belonging to a group of fibers to be distributed coming from a distribution or transmission cable and intermediate fibers for connecting the previously mentioned fibers to the individual connection members 8 of the socket 6 carried by the support arm to which the cassette is articulated. The structures 20 of a cassette for coiling up the fibers are formed by internal walls projecting from the bottom of the cassette and disposed to prevent any risk of breaking the length of optical fiber to be coiled up in the cassette. This is known in the art.

Two separate conduits are provided to enable the fibers of a group and the intermediate connecting fibers to enter a cassette in the area where the cassette is articulated to the articulation member 26 of the support arm that carries it. In the embodiment shown, in which the cassette is symmetrical with respect to a median plane, two conduits 29 and 30 or 29' and 30' open laterally at the ends of the cassette, on the shorter sides of the cassette and on respective opposite sides of each of the shaft clips 28 or 28', only the passages near the shaft clip by means of which the cassette is supported by a support arm being used.

The conduits 29 and 29' of a cassette are adapted to allow the fibers of a group to penetrate into the cassette in order for each to be connected therein to an intermediate connecting fiber by means of splices, not shown.

The conduits through which the fibers of a group penetrate into the cassette are provided with an auxiliary device for immobilizing the fibers. This auxiliary immobilizing device is, for example, a clip-on stowage bracket as described with reference to FIG. 4 of French patent application 2789497, adapted to immobilize at least one protective tubular sheath in which the whole or part of a group of fibers as referred to above is placed.

The conduits 30 and 30' of a cassette are adapted to allow the intermediate connecting fibers accommodated in the U-shaped passage of a support arm to penetrate into a cassette 23 articulated to that arm by one of its shaft clips, via the conduits near that clip, with no risk of bending and therefore of breaking, despite rotation of the cassette about the axis of the articulation member of the support arm that carries it. Here this rotation is possible between the normal position and a limit working position that is mechanically fixed by a portion of the cassette abutting against a portion of the arm to which the cassette is articulated.

In the proposed embodiment, the input/output fibers and the intermediate connecting fibers that are interconnected in a cassette enter via passages 29 and 30 or 29' and 30' reserved for them on respective opposite sides of the same shaft clip 28 or 28' of the cassette. The conduit 30 or 30' through which the intermediate connecting fibers enter is disposed so as to open out along the extension carrying the articulation member 26 or 26' of the support arm against which the cassette is pressed when the latter is in the normal position. To this end, the extension leaves an empty space around the articulation member that carries it, through which empty space fibers can be passed when a cassette is mounted on that member.

A fiber of a group can be spliced to an intermediate connecting fiber by various means whose external shape is usually tubular and which are conventionally retained in position in the cassette by a stack of elastic tongues 31 between which the various splices between fibers are immobilized. This is known in the art. The retention of the fiber contained in a cassette is conventionally complemented by retaining lugs 32 projecting from the walls of the cassette parallel to its bottom so as to cover partly the portions of the cassette containing the coiled up fiber.

The optical fibers coming from the sockets 6 then enter the conduits 30 and 30' and the fibers from the cables enter the conduits 29, 29' or 30 and 30' in accordance with the chosen optimum architecture. The connections between the fibers can be provided by welded splices, either individually or in groups. In the former case, the splices are positioned between the elastic blades 31. In the second case, the blades 31 are detached from the cassette.

The four conduits 29, 29', 30 and 30' are contiguous to the shaft clips 28 and 28' and thus the movements needed to be able to work on the fibers in a cassette cause negligible displacements of the other fibers in the cassette.

One or more of the sockets 6 in two or more of the racks, such as the racks 11A and 11B in FIG. 3, are initially fitted before any jumper connections are made in the distribution frame that includes the racks. Because the number of sockets in this kind of distribution frame is particularly high, there is provision for making the jumper connections automatically, using a dedicated robot with a set of tools 33 and able to move in front of the racks of the distribution frame to enable the members to intervene in the context of the operations necessary to make the jumper connections and to modify them over time for each of the connection points of the sockets 6 disposed on the front face of the racks.

Here the set of tools 33 moves in two directions in a plane parallel to the reference plane defined by the front faces of the sockets at the front of the racks. For example, it is mobile in translation on a vertical support 34 which is itself mobile in translation in the horizontal direction, and therefore includes displacement means, which are motorized and controlled by programmed control logic, not shown, able to supervise the operations of making and modifying jumper connections referred to above for the whole of the distribution frame. Horizontal movements of the vertical support 34 are guided by rails 35 respectively disposed at the top and at the bottom of the distribution frame and parallel to the reference plane defined above, for example (see FIGS. 3 and 4).

FIGS. 9A to 9D show a module according to the invention in various relative positions of the arm 19 and the cassette 23, made possible by the features of those components.

As can be seen in FIGS. 9A and 9B, the cassette 23 can be positioned above the arm 19, with its bottom on the same side as the bottom of the arm (FIG. 9A) or with its bottom on the opposite side to that of the arm (FIG. 9B). Its position is stable because it bears on the arm 19.

As can be seen in FIGS. 9C and 9D, the cassette 23 can be positioned under the arm 19, with its bottom on the same side as the bottom of the arm (FIG. 9C) or with its bottom on the opposite side to that of the arm (FIG. 9D). Its position is then stable because of an arrangement for clipping the cassette to the arm (not described above), provided by a pawl 23A carried by the cassette which clips into a corresponding orifice in the arm.

These various relative positions can be obtained thanks to the symmetrical shape of the cassette.

FIG. 10 is an overall view of the preferred method of assembling modules and corresponds to an assembly mode of the type shown in FIG. 5, without showing the components of the distribution frame.

As already explained, thanks to the invention, an optimum compact alignment is possible whilst complying with the positions of the connecting sockets and benefiting from the possibility of manipulating the fibers without demounting thanks to the articulation between the arm 19 and the cassette 23.

What is claimed is:

1. A module for connecting and distributing optical fibers, intended for use in an optical distribution frame, a first end of each fiber being connected to a connecting socket and a second end of each fiber being connected to an optical distribution or transmission cable, module comprising:

a rigid supporting arm fixed to a support for a row of connecting sockets, said supporting arm further configured to guide each fiber, said supporting arm fixed at a first end to said support for a row of connecting sockets and connected at a second end to the outside of a cassette for coiling up each fiber, wherein in said module, said cassette is articulated to said supporting arm, said supporting arm is bent twice in opposite directions in two dimensions.

2. The module claimed in claim 1, wherein said arm is fixed.

3. The module claimed in claim 1, wherein said arm has at its second end an articulation member for said cassette consisting of a horizontal pivot.

4. The module claimed in claim 3, wherein said pivot projects laterally from a plane extension of the bottom of a U-shaped passage formed by said arm.

5. The module claimed in claim 1, wherein said cassette includes an articulation member in the form of a pivot clip complementary to said articulation member carried by the support arm.

6. The module claimed in claim 5, wherein the complementary articulation member carried by said cassette is surrounded by two fiber conduits, a first of said conduits, on the inward side of said cassette relative to the other one and said complementary articulation member that it adjoins, being adapted to convey each fiber toward said arm carrying said cassette when the latter is carried by said complementary articulation member that said first conduit adjoins, the second of said conduits, which is on the outward side of said cassette relative to said first conduit and said complementary articulation member that it adjoins, being intended for the passage of fibers emanating from distribution or transmission cables that are connected to said cassette.

7. The module claimed in claim 5, wherein said cassette includes two articulation members symmetrically disposed with respect to a transverse plane at the ends of one of the longer sides of the module that said cassette forms articulated by one or the other of said two complementary articulation members claimed in the mounting provided for said arm.

8. The module claimed in claim 1, wherein said cassette carries a clipping pawl adapted to cooperate with a corresponding orifice in said arm.

9. The module claimed in claims 1–4, wherein said cassette includes an articulation member in the form of a pivot clip complementary to said articulation member carried by the support arm.

10. The module as claimed in claim 1, wherein said arm articulated to said cassette is bent twice in opposite directions in two dimensions, said bend located halfway along the length of the arm.

* * * * *